United States Patent
Nagakubo et al.

(10) Patent No.: US 6,714,187 B2
(45) Date of Patent: Mar. 30, 2004

(54) INFRARED REMOTE CONTROL DEVICE FOR PLASMA DISPLAY DEVICE

(75) Inventors: Tetsuro Nagakubo, Nakakoma-gun (JP); Tetsuya Shigeta, Nakakoma-gun (JP); Hirofumi Honda, Nakakoma-gun (JP)

(73) Assignee: Pioneer Corporation, Tokyo (JP)

( * ) Notice: Subject to any disclaimer, the term of this patent is extended or adjusted under 35 U.S.C. 154(b) by 468 days.

(21) Appl. No.: 09/874,356

(22) Filed: Jun. 6, 2001

(65) Prior Publication Data

US 2002/0015112 A1 Feb. 7, 2002

(30) Foreign Application Priority Data

Jun. 9, 2000 (JP) .......................................... 2000-173584

(51) Int. Cl.[7] .................................................. G09G 5/08
(52) U.S. Cl. ........................ 345/158; 345/169; 341/176
(58) Field of Search ........................... 345/60, 67, 158, 345/169; 341/176

(56) References Cited

U.S. PATENT DOCUMENTS

| | | | | |
|---|---|---|---|---|
| 5,999,570 A | * | 12/1999 | Chaki | ........................ 375/281 |
| 6,072,448 A | * | 6/2000 | Kojima et al. | ................. 345/63 |
| 6,271,831 B1 | * | 8/2001 | Escobosa et al. | ........... 345/158 |
| 6,346,934 B1 | * | 2/2002 | Wugofski | .................... 345/158 |
| 6,532,004 B1 | * | 3/2003 | Harrison et al. | ............. 345/169 |
| 6,560,469 B1 | * | 5/2003 | Kim et al. | ................ 455/569.1 |
| 6,590,503 B1 | * | 7/2003 | Elliott | .................... 340/825.69 |
| 6,597,374 B1 | * | 7/2003 | Baker et al. | ................. 345/717 |
| 6,624,854 B1 | * | 9/2003 | Isogai et al. | ................. 348/744 |
| 6,640,337 B1 | * | 10/2003 | Lu | ............................... 725/39 |

* cited by examiner

*Primary Examiner*—Richard Hjerpe
*Assistant Examiner*—Kimnhung Nguyen
(74) *Attorney, Agent, or Firm*—Sughrue Mion, PLLC

(57) ABSTRACT

An infrared remote control device used for a plasma display device in which a light-reception signal is obtained by reception of infrared rays, the light-reception signal is demodulated, a signal component during an emission sustaining period is removed from the modulated output signal by a gate circuit, the output signal is output, the output signal of the gate circuit is delayed by a delaying circuit in the field, the logical sum of the output signal of the gate circuit and the output signal of the delaying circuit is calculated, and the contents of the remote control signal that controls the operation of the plasma display device are judged in accordance with a signal obtained by the calculation of the logical sum.

4 Claims, 3 Drawing Sheets

INFRARED REMOTE CONTROL DEVICE FOR PLASMA DISPLAY DEVICE

BACKGROUND OF THE INVENTION

1. Field of the Invention

The present invention relates to an infrared remote control device used for a plasma display device.

2. Description of the Related Background Art

Most remote control devices used to remotely control video equipment employ infrared rays as carriers of a remote control signal transmitted from a transmitter thereof. Since the directional angle of the infrared rays is easily controlled, the video equipment can be usually controlled without exerting an influence upon equipment other than the video equipment if the infrared emission direction of the remote control device is aimed roughly at the video equipment.

When a plasma display device is used as a video equipment, discharge is continuously carried out between electrodes of a discharge cell (for performing discharge) that constitutes each pixel of the plasma display panel during an emission sustaining period for maintaining the light emission of the discharge cell. It is known that a large amount of infrared noise of an infrared frequency band is produced because of the heat of the cell that is discharging. Since the infrared noise is emitted from the display screen of the plasma display device, an infrared-ray receiving portion for remote control in the plasma display device is situated at a position slightly further inside than the display screen in the surface of the plasma display device so that the infrared noise does not reach the receiving portion thereof. Therefore, an infrared-receptive angle range of the infrared-ray receiving portion of the plasma display device is narrowed, and, disadvantageously, the plasma display device cannot be remotely controlled unless a user operates the transmitter of the remote control device to point the infrared emission direction thereof toward the infrared-ray receiving portion of the plasma display device with accuracy.

SUMMARY OF THE INVENTION

It is therefore an object of the present invention to provide a remote control device that is capable of remotely controlling a plasma display device with good operability and with accuracy by excluding influence of infrared noise.

The infrared remote control device according to the present invention is used for a plasma display device in which each field is divided into an address period for setting a discharge cell that constitutes each pixel to either a light emission cell or a non-light emission cell in accordance with pixel data and an emission sustaining period for causing only the discharge cell set as the light emission cell to emit light, in order to drive the plasma display panel, the infrared remote control device comprising: a light-reception portion for obtaining a light-reception signal by reception of infrared rays and for demodulating the light-reception signal; a removing device for removing a signal component during the emission sustaining period from an output signal of the light-reception portion and for outputting a remaining signal component after removing; a delaying device for delaying the output signal of the removing device in a field unit; a logical-sum device for calculating a logical sum of the output signal of the removing device and an output signal of the delaying device; and a determining device for determining a content of a remote control signal that controls an operation of the plasma display device in accordance with the logical sum calculated by the logical-sum device.

DETAILED DESCRIPTION OF THE PREFERRED EMBODIMENT

An embodiment of the present invention will be hereinafter described in detail with reference to the attached drawings.

Figure 1:
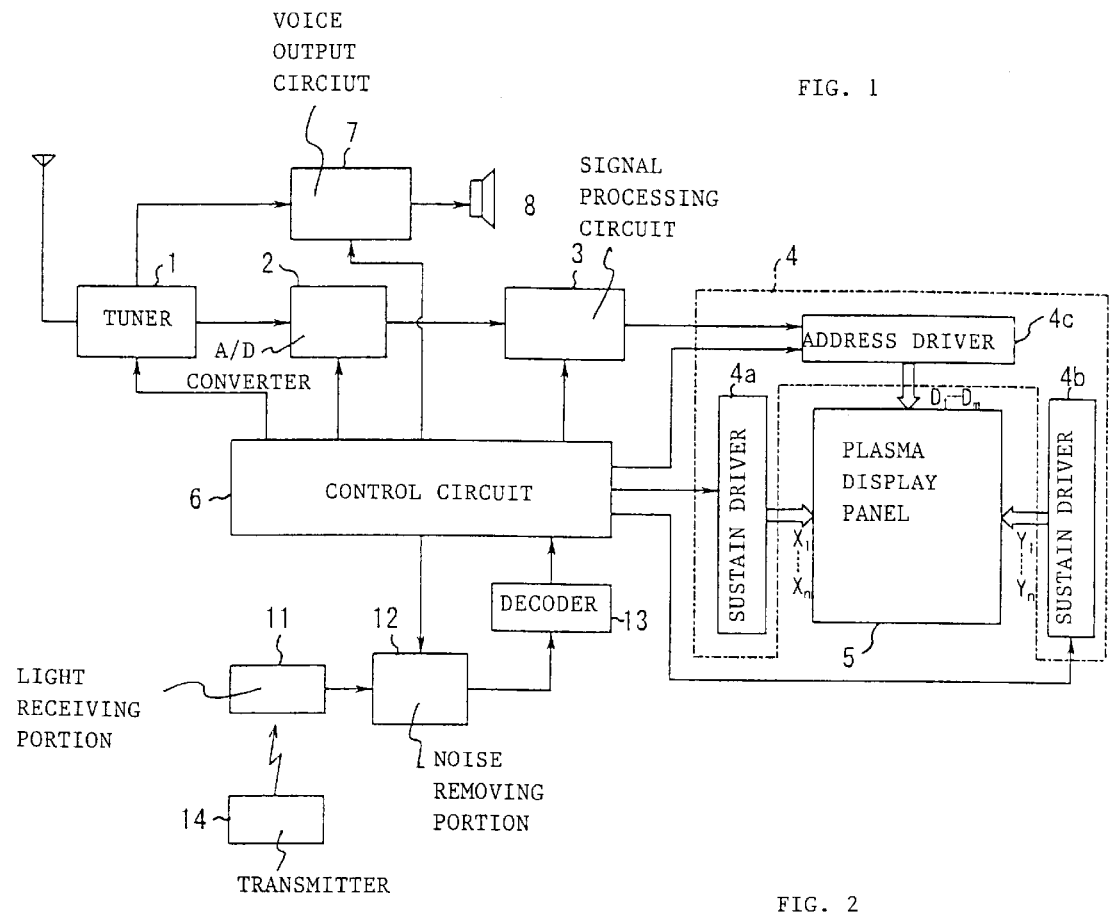
FIG. 1 is a block diagram showing the structure of a plasma display device to which a remote control device according to the present invention is applied.

FIG. 1 shows the structure of a plasma display device to which a remote control device according to the present invention is applied.

The plasma display device includes a tuner 1 for receiving television broadcasting electric waves. The tuner 1 outputs a video signal and an audio signal. The video signal output from the tuner 1 is converted into a digital video signal by an A/D converter 2, and is then supplied to a signal processing circuit 3. The signal processing circuit 3 sequentially forms pixel data relating to each row for each field in accordance with the digital video signal, and outputs it to a driving circuit 4. The driving circuit 4 drives a plasma display panel 5.

The plasma display panel 5 has a plurality of discharge cells arranged in the shape of a matrix, and the plurality of discharge cells consist of a plurality of column electrodes and a plurality of row electrodes. That is, the discharge cells consist of column electrodes $D_1$ to $D_m$ serving as address electrodes and row electrodes $X_1$ to $X_n$ and $Y_1$ to $Y_n$ that are perpendicular to the column electrodes. In the plasma display panel 5, a pair of the row electrode ($X_1$ to $X_n$) and the row electrode ($Y_1$ to $Y_n$) forms a row electrode that corresponds to one row. The row electrode pair at the first row is the row electrode $X_1$ and the row electrode $Y_1$ in the plasma display panel 5, and the row electrode pair at the n-th row ("-th" is a suffix representing an ordinal number) is the row electrode $X_n$ and the row electrode $Y_n$. The row electrode pair and the column electrode are coated with a dielectric layer against a discharge space. A discharge cell that corresponds to one pixel is formed by an intersection of each row electrode pair and one column electrode.

The driving circuit 4 includes sustain drivers 4a, 4b and an address driver 4c. The first sustain driver 4a is connected to the plurality of row electrodes $X_1$ to $X_n$ of the plasma display panel 5, and the second sustain driver 4b is connected to the plurality of row electrodes $Y_1$ to $Y_n$ of the plasma display panel 5. The address driver 4c is connected to the plurality of column electrodes $D_1$ to $D_m$ of the plasma display panel 5.

The address driver 4b generates m pixel data pulses each of which has a voltage that corresponds to the logical level of each bit of conversion pixel data for one row of a video signal output from the signal processing circuit 3. The m pixel pulses are generated in response to a timing signal supplied from a control circuit 6, and are applied to the column electrodes $D_1$ to $D_m$ of the plasma display panel 5, respectively.

The first sustain driver 4a and the second sustain driver 4b each generate a driving pulse in response to a timing signal supplied from the control circuit 6, and applies them to the row electrodes $X_1$ to $X_n$ and $Y_1$ to $Y_n$ of the plasma display panel 5.

The control circuit 6 generates various timing signals synchronously with a horizontal synchronizing signal and a vertical synchronizing signal of the video signals output from the tuner 1. The timing signals are supplied to the A/D converter 2, to the signal processing circuit 3, to the sustain drivers 4a, 4b, and to the address driver 4c.

The audio signal output from the tuner 1 is supplied to a voice output circuit 7. The voice output circuit 7 drives a speaker 8 in accordance with the audio signal.

The control circuit 6 outputs a control signal to the tuner 1 and the voice output circuit 7. The control signal is generated on the basis of command data output from a receiving section of a remote control device, described later. For example, the control signal is used for a change in the receiving channel of the tuner 1 or a change in amplification gain of the voice output circuit 7.

The receiving section of the remote control device includes a light-receiving portion 11, a noise removing portion 12, and a decoder 13. The light-receiving portion 11 receives infrared rays that carries a remote control signal, output from a transmitter 14. The light-receiving portion 11 applies a demodulating operation to the signal of the received infrared rays, and outputs a pulse signal to the noise-removing portion 12. The noise-removing portion 12 is connected to the output of the light-receiving portion 11, and is connected to the control circuit 6. The control circuit 6 outputs a cutoff pulse signal that indicates an emission sustaining period to the noise-removing portion 12. The noise-removing portion 12 removes an output signal of the light receiving portion 11 during the emission sustaining period in response to the cutoff pulse signal in order to output a remote control signal.

Figure 2:
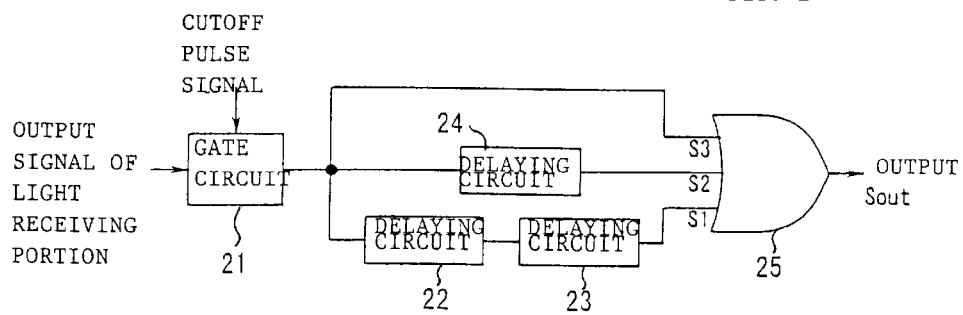
FIG. 2 is a block diagram showing the structure of a noise-removing portion of the device of FIG. 1.

The specific structure of the noise-removing portion 12 is as shown in FIG. 2. The noise-removing portion 12 includes a gate circuit 21, three delaying circuits 22 to 24, and an OR circuit 25. When no cutoff pulse signal is supplied from the control circuit 6, the gate circuit 21 outputs the output signal of the light receiving portion 11 as it is, and, when a cutoff pulse signal is supplied, the gate circuit 21 does not output the output signal by cutting it off.

Each of the delaying circuits 22 to 24 has a delay time of one field. The OR circuit 25 has three input ports. The first input port is connected to the output of the gate circuit 21 through the two delaying circuits 22 and 23 in series. The second input port is connected to the output of the gate circuit 21 through the one delaying circuit 24. The third input port is connected directly to the output of the gate circuit 21. The output of the OR circuit 25 is the output of the noise removing portion 12.

The decoder 13 discriminates the contents of the command data in accordance with the cycle and pulse width of each pulse of a remote control signal, and supplies the result of the discrimination to the control circuit 6.

The transmitter 14 transmits a remote control signal, with the infrared rays as a carrier, in response to a key operation of the user.

Next, the operation of the thus constructed plasma display device will be described.

Figure 3:
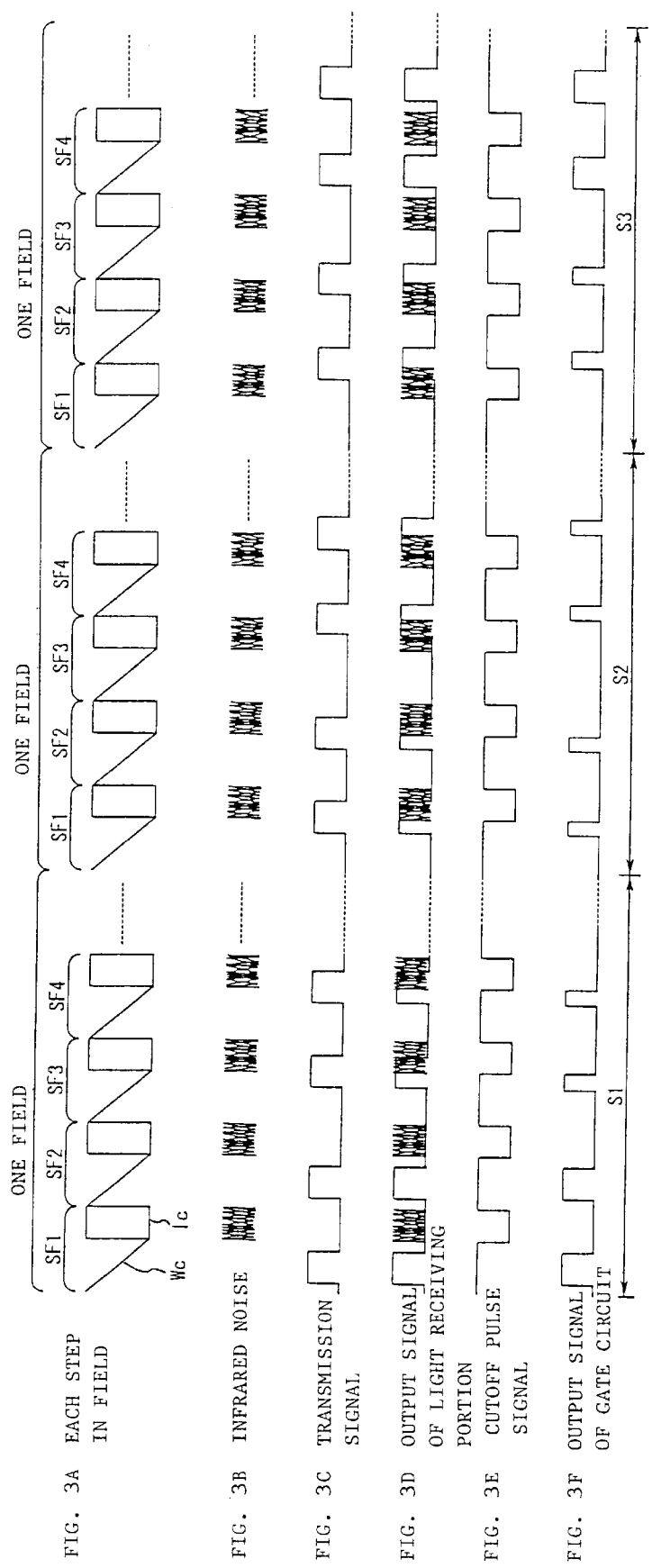
FIG. 3A to FIG. 3F are each a timing chart showing the operation of each portion of the device of FIG. 1.

In the plasma display device, the display period of one field is divided into, for example, a plurality of subfields SF1, SF2, SF3, SF4, . . . as shown in FIG. 3A, and the plasma display panel 5 is driven for each subfield. This is to perform gradation display. In each subfield, a pixel data writing step (address period) Wc and an emission sustaining step Ic are carried out. In the pixel data writing step Wc, pixel data is written onto each discharge cell of the plasma display panel 5 so as to set the light emission cell and the non-light emission cell, and, in the emission sustaining step Ic, only the light emission cell continuously emits light only during a period (frequency) that corresponds to weighting of each subfield. Further, a simultaneous reset step Rc (not shown) for initializing all the discharge cells of the plasma display panel 5 is carried out only during the first subfield SF1, and a deletion step E (not shown) is carried out only during the last subfield.

First, in the simultaneous reset step Rc, the first sustain driver 4a and the second sustain driver 4b simultaneously apply reset pulses $RP_X$ and $RP_Y$ to the row electrodes $X_1$ to $X_n$ and $Y_1$ to $Y_n$ of the plasma display panel 5. In accordance with the application of the reset pulses $RP_X$ and $RP_Y$, all the discharge cells of the plasma display panel 5 discharge for resetting, so that predetermined wall charges are formed evenly in all the discharge cells. As a result, all the discharge cells can become the light emission cells and/or non-light emission cells.

Thereafter, at the pixel data writing step Wc, the address driver 4c sequentially applies the pixel data pulse group of each row to the column electrodes $D_1$ to $D_m$. The address driver 4c generates a high-voltage pixel data pulse and applies it to the column electrodes only when a bit level of the conversion pixel data is, for example, a logical level "1". With the same timing as the application timing of each pixel data pulse group, the second sustain driver 4b generates a scanning pulse and sequentially applies the scanning pulse to the row electrodes $Y_1$ to $Y_n$. A discharge (i.e., selection deleting discharge) occurs only in the discharge cell at the intersection of the "row" to which the scanning pulse is applied and the "column" to which the high-voltage pixel data pulse is applied, and the wall charge remaining in the discharge cell is selectively deleted. By the selection deleting discharge, the discharge cell that is initialized into the state of the light emission cell at the simultaneous reset step Rc changes to the non-light emission cell. The discharge cells belonging to the "column" to which no high-voltage pixel data pulse is applied do not produce discharge, and maintain the state initialized at the simultaneous reset step Rc, i.e., maintains the light emission state.

In other words, by the execution of the pixel data writing step Wc, the emission cells that maintain the light emission state at the emission sustaining step, described later, and the non-light emission cells in the turned-off state are selectively set in accordance with pixel data so as to perform so-called pixel data writing.

At the emission sustaining step Ic, the first sustain driver 4a and the second sustain driver 4b alternately apply sustain pulses $IP_X$ and $IP_Y$ (both not shown) to the row electrodes $X_1$ to $X_n$ and $Y_1$ to $Y_n$. The discharge cell in which the wall charge still remains by the pixel data writing step Wc, i.e., the light emission cell repeatedly performs discharge/light emission, and maintains the light emission state during the period where the sustain pulses $IP_X$ and $IP_Y$ are alternately applied, i.e., during the light emission sustaining period. The light emission sustaining period (frequency) is set in accordance with the weighting of each subfield.

During the light emission sustaining period, infrared rays are radiated as noise from the screen of the plasma display panel 5, as shown in FIG. 3B.

On the other hand, assume that a remote control signal is transmitted from the transmitter 14, with infrared rays as a carrier, as shown in FIG. 3C, and the transmission of the remote control signal covers least three fields.

The infrared rays carrying a remote control signal are received by the light receiving portion 11 as shown in FIG. 3D, and the infrared noise radiated from the plasma display panel 5 is also received thereby. If the infrared noise radiates at the time that the remote control signal is generated, the infrared rays of the remote control signal are received by the light receiving portion 11 in a state where the infrared noise is mixed therewith. The light receiving portion 11 demodulates a light-reception signal, and then outputs the demodulated signal as a reception remote control signal.

The control circuit 6 generates a cutoff pulse signal during the light emission sustaining period, as shown in FIG. 3E. The cutoff pulse signal is then supplied to the gate circuit 21. Since the cutoff pulse signal is generated in response to the occurrence of infrared noise, the output signal of the light receiving portion 11 is cut off in the gate circuit 21 while the cutoff pulse signal is being supplied. Accordingly, an infrared-noise-mixed part of the mixed remote control signal is deleted as shown in FIG. 3F, and only a remote control signal part thereof is output from the gate circuit 21.

The output signal of the gate circuit 21 is delayed by two fields by the delaying circuits 22 and 23, and is delayed by one field by the delaying circuit 24. If the output signal S1 of the delaying circuit 23 is that of the left field of the figure as shown in FIG. 3F, the output signal S2 of the delaying circuit 24 is that of the subsequent central field thereof, and the output signal S3 of the gate circuit 21 is that of the right field thereof.

Figure 4:
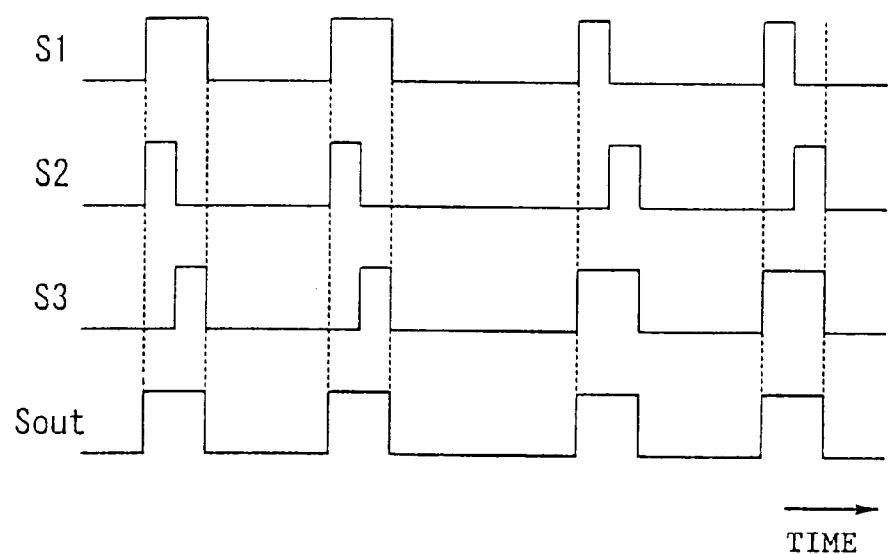
FIG. 4 is a timing chart showing the logical-sum operation of the device of FIG. 1.

The output signals S1 to S3 are the same signals if the infrared noise is not mixed therewith. As shown in FIG. 4, the logical sum of the output signals S1 to S3 is calculated by the OR circuit 25, and is obtained as Sout. Accordingly, the part that has been lost by the mixture of the infrared noise is complementarily restored. As a result, the output signal Sout of the OR circuit 25 becomes the remote control signal transmitted in the form of infrared rays from the transmitter 14 without any insufficiency.

The remote control signal output from the OR circuit 25 is decoded by the decoder 13, and is then supplied to the control circuit 6. The control circuit 6 controls a change in the receiving channel of the tuner 1 or a change in the amplification gain of the voice output circuit 7 on the basis of command data indicated by the remote control signal decoded by the decoder 13.

Although the logical sum of the output signals S1 to S3 is calculated in the OR circuit 25 in the above embodiment, the logical sum of only the output signals S2 and S3 may be calculated.

Further, although each field is divided into a plurality of subfields for the gradation display driving of the plasma display panel in the above embodiment, the present invention can be applied to a device in which each field is divided into an address period and an emission sustaining period for the display driving of the plasma display panel without employing such a subfield method.

As mentioned above, according to the present invention, the plasma display device can be remotely controlled with good operability and with accuracy while excluding the influence of the mixed infrared noise.

This application is based on a Japanese Application No. 2000-173584 which is hereby incorporated by reference.

What is claimed is:

1. An infrared remote control device used for a plasma display device in which each field is divided into an address period for setting a discharge cell that constitutes each pixel to either a light emission cell or a non-light emission cell in accordance with pixel data and an emission sustaining period for causing only the discharge cell set as the light emission cell to emit light, in order to drive the plasma display panel, the infrared remote control device comprising:

a light-reception portion for obtaining a light-reception signal by reception of infrared rays and for demodulating the light-reception signal;

a removing device for removing a signal component during the emission sustaining period from an output signal of the light-reception portion and for outputting a remaining signal component after removing;

a delaying device for delaying the output signal of the removing device in a field unit;

a logical-sum device for calculating a logical sum of the output signal of the removing device and an output signal of the delaying device; and a determining device for determining a content of a remote control signal that controls an operation of the plasma display device in accordance with the logical sum calculated by the logical-sum device.

2. An infrared remote control device of claim 1, wherein the plasma display device performs gradation display by dividing each field into a plurality of subfields, each of which includes the address period and the emission sustaining period.

3. An infrared remote control device of claim 1, further comprising transmission means for transmitting the remote control signal in accordance with an input operation, with the infrared rays as a carrier.

4. An infrared remote control device of claim 1, wherein the delaying device includes a first delaying circuit for delaying the output signal of the removing means by two fields and a second delaying circuit for delaying the output signal of the removing means by one field, and the logical-sum device calculates a logical sum of the output signal of the removing device and output signals of the first and second delaying circuits.

* * * * *